United States Patent [19]

Naito

[11] 4,104,837
[45] Aug. 8, 1978

[54] WALL CONSTRUCTING METHOD AND WALL CONSTRUCTED THEREBY

[76] Inventor: Han-Ichiro Naito, 15-1002, Wakaba-1-chome, Shinjuku-ku, Tokyo, Japan

[21] Appl. No.: 819,650

[22] Filed: Jul. 27, 1977

Related U.S. Application Data

[63] Continuation-in-part of Ser. No. 750,042, Dec. 13, 1976, abandoned.

[51] Int. Cl.² .......................... E04C 2/08; E04B 1/82; E06B 3/12
[52] U.S. Cl. .................................... 52/173 R; 52/239; 52/241; 52/282; 52/579; 52/588; 52/741; 52/743
[58] Field of Search .................... 52/67, 239, 241, 281, 52/173, 352, 353, 531, 579, 588, 632, 741, 64, 743; 160/222, 202

[56] References Cited

U.S. PATENT DOCUMENTS

| | | | |
|---|---|---|---|
| 376,979 | 1/1888 | De La Sauce | 52/579 |
| 1,330,224 | 2/1920 | Whitson | 160/202 X |
| 3,605,363 | 9/1971 | Bard | 52/588 X |
| 3,667,175 | 6/1972 | Bjorksten | 52/241 |
| 3,698,465 | 10/1972 | Aberg | 160/222 |
| 3,742,672 | 7/1973 | Schaeufele | 52/588 X |
| 3,755,978 | 9/1973 | Jackson | 52/241 X |
| 3,815,311 | 6/1974 | Nisula et al. | 52/579 |
| 3,886,851 | 6/1975 | Berner | 160/202 |

FOREIGN PATENT DOCUMENTS

| | | | |
|---|---|---|---|
| 1,498,077 | 9/1967 | France | 160/202 |
| 643,611 | 8/1962 | Italy | 52/67 |
| 1,243,173 | 8/1971 | United Kingdom | 52/426 |

*Primary Examiner*—Alfred C. Perham
*Attorney, Agent, or Firm*—Pollock, Vande Sande & Priddy

[57] ABSTRACT

A wall of a building is constructed by joining a plurality of partition units of substantially U-like cross-sectional shape. During storage or transportation, the partition units are grouped into a telescoped assembly by forcing each partition unit into the internal space of another. During construction of the wall, the partition units are successively drawn to be joined together while being engaged at the upper or lower end thereof by a guide member thereby providing continuous flat partition wall surfaces. Then, a filler material is usually filled in the internal space of the joined partition units to complete the wall, but such filling work can be dispensed with where ready installing and disassembling is desired or where insulation against heat and or sound is not required.

12 Claims, 10 Drawing Figures

WALL CONSTRUCTING METHOD AND WALL CONSTRUCTED THEREBY

This application is a continuation-in-part of application Ser. No. 750,042 filed Dec. 13, 1976 now abandoned.

This invention relates to a method for constructing walls of houses, office buildings, etc. and also to walls thereby constructed.

Walls built of brick, stone, concrete block, reinforced concrete, steel frame, wood, etc. are used to define the boundary between the interior and the exterior of buildings and to form partitions between the rooms of buildings. The reinforced concrete, steel-framed and wooden walls are constructed by first erecting pillars, fitting molding frames between the pillars, and casting concrete into the internal space of the molding frames, or fixing iron plates, asbestos boards or iron net-reinforced mortar boards between the pillars, or fastening wooden panel boards between the pillars by nails. In the case of cast-in-place concrete walls, the molding frames must be extended to cover the entire area of the walls, while in the case of wooden walls, head posts must be erected between the pillars, and the wooden panel boards must be suitably cut to conform to the area between the pillars and the associated studs.

It is a primary object of the present invention to provide a novel process for constructing a wall, which differs entirely from such prior art processes.

In accordance with one aspect of the present invention, there is provided a method for constructing a wall comprising preparing a plurality of partition units of substantially U-like cross-sectional shape, grouping the partition units into a telescoped assembly by forcing each of the successive units into the internal space of another, transporting the partition units to the site of construction in the telescopically assembled state, drawing the partition units one after another from the telescoped assembly while guiding them by guide means engaging with at least the upper or lower end thereof until all the partition units are completely drawn to be joined at their trailing end to the leading end of the adjoining ones to provide flat continuous partition wall surfaces, and filling a filler material in the internal space of the joined partition units to complete the wall.

In the method according to the present invention, the work required on the construction site includes merely drawing to join the partition units one after another while guiding them by a guide member, and then filling a filler material in the internal space of the joined units. Thus, the work that must be done on the construction site can be greatly simplified, and the wall can be precisely constructed without requiring any skilled workers.

The present invention provides also a wall which can be constructed by such a simple method. In accordance with another aspect of the present invention, there is provided a wall comprising a plurality of partition units each consisting of a pair of wall surface providing members of small thickness disposed opposite to each other with a predetermined distance therebetween to provide partition wall surfaces, connecting means including at least one connecting member for connecting the wall surface providing members together by engaging with one end thereof and normally resiliently urging the other end portions of the wall surface providing members toward each other in a closing direction, each of the wall surface providing members being formed adjacent to both ends thereof with engaging means engageable with similar engaging means of mating shape formed adjacent to the associated ends of the adjoining wall surface providing members to provide a continuous flat wall surface when joined together, each of the partition units being adapted to be telescoped into the internal space of another at the end provided with the connecting members, guide means for guiding drawing movement of the telescoped partition units drawn one after another, the guide means engaging with at least the upper or lower end of the partition units to limit the drawing direction thereof during construction of the wall by successively drawing the telescoped partition units, and a filler material filled in the internal space of the joined partition units providing the partition wall surfaces. Each of the partition units is open at the end not provided with the connecting member and can be telescoped into another from this open end. The successive partition units are telescoped in this manner to form a telescoped assembly which does not occupy a large space during storage and transportation. On the site of construction, the partition units thus telescopically assembled can be easily drawn one after another to constitute the partition wall surfaces.

According to the present invention, usually, the filler material is filled in the internal space of the joined partition units when the wall is required to be rigidly fixed, but it is not always recessary to fill the filler material in the internal space of the joined partition units where the wall is required to be readily installed and removed or it is not necessary that it be insulated from heat and or sound.

Other objects, features and advantages of the present invention will become apparent from the following detailed description of a preferred embodiment thereof taken in conjunction with the accompanying drawing, in which.

Figure 1:
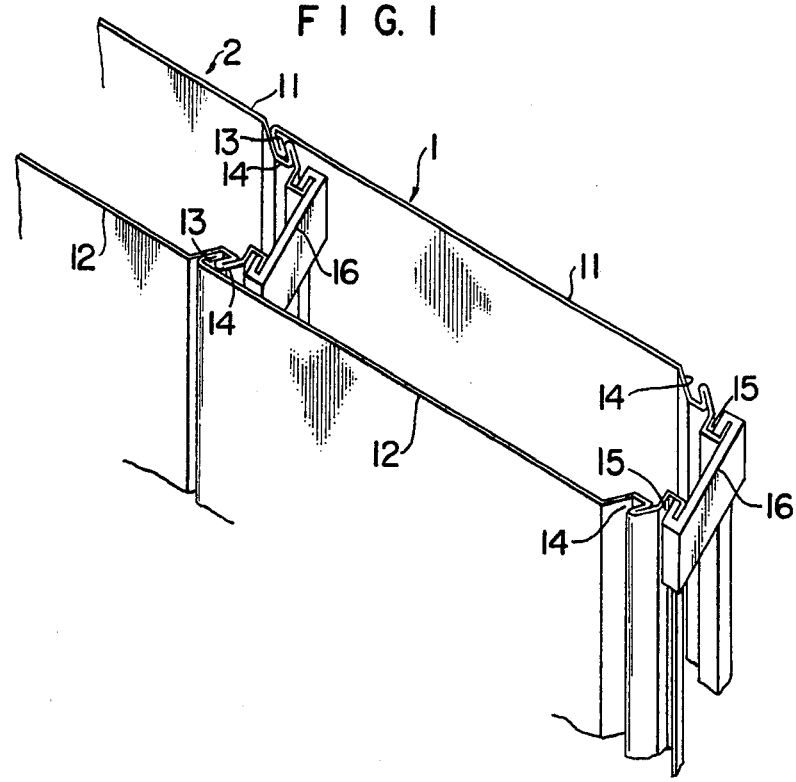
FIG. 1 is a schematic perspective view showing part of partition units in a fully drawn state.
Figure 2:
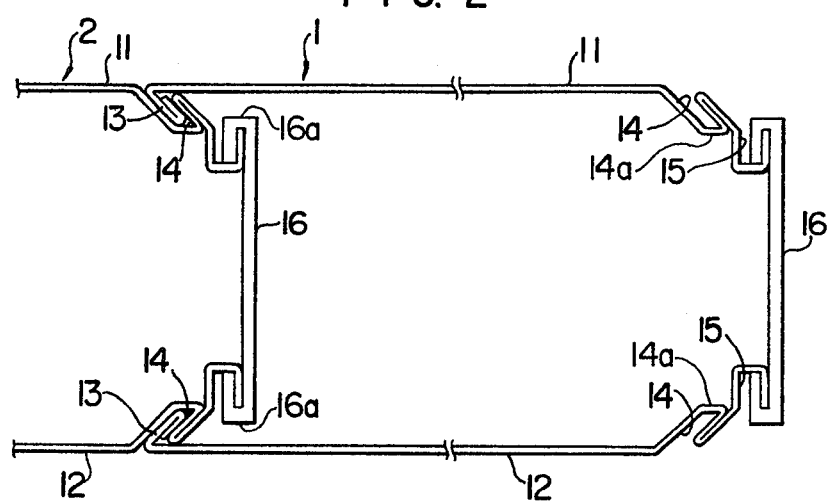
FIG. 2 is a schematic top plan view of FIG. 1.
Figure 3:
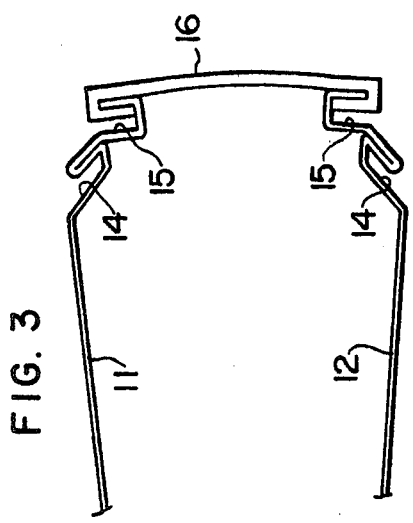
FIG. 3 is a schematic top plan view of one of the partition units.

Referring to the drawing, FIGS. 1 and 2 show two partition units 1 and 2 in a fully drawn and joined state. The structure of the partition unit 1 will now be described in detail, by way of example, since the partition units 1 and 2 have the same structure. The partition unit 1 is composed of a pair of wall surface forming members 11 and 12 of small thickness made of a metal such as iron or aluminum. Each of these wall surface forming members 11 and 12 is formed with an inwardly bent engaging lug 13 adjacent to one end thereof, and a diagonally outwardly directed engaging recess 14 adjacent to the other end thereof which is shaped to provide an inwardly protruding stepped end edge 15. The wall surface forming members 11 and 12 are disposed opposite to each other with their engaging lugs 13 and engaging recesses 14 arranged in symmetrical relation. These wall surface forming members 11 and 12 are connected to each other by a resilient connecting member 16 engaging with the stepped end edges 15 thereof. The resilient connecting member 16 is made of, for example, a spring steel or synthetic resin having a high elasticity and acts to normally resiliently urge the wall surface forming members 11 and 12 toward each other in a closing direction at the end portions formed with the engaging lugs 13 as shown in FIG. 3. Although only one resilient connecting member 16 of small width is shown in FIG. 1, a plurality of such members 16 are disposed in vertically suitably spaced apart relation. Alternatively, a single resilient connecting member 18 of large width may be disposed in the middle of the total height of the partition unit 1.

Figure 4:
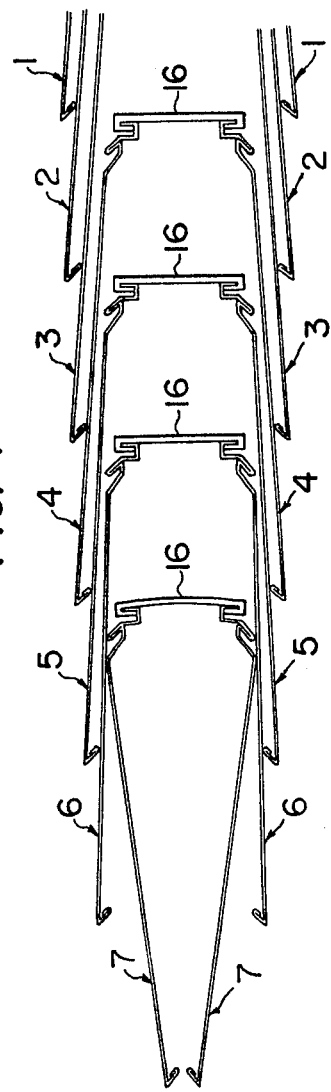
FIG. 4 is a schematic top plan view showing part of the partition units in a gradually drawn state.

FIG. 4 shows a plurality of such partition units 1 to 7 in a successively telescoped state. Referring to FIG. 4, the partition unit 2 is forced into the internal space of the partition unit 1 at the end having the connecting member 16, and the partition unit 3 is forced into the internal space of the partition unit 2 at the end having the connecting member 16. Similarly, the remaining partition units 4 to 7 are successively telescoped in the manner above described. Each of the partition units 1 to 6 is forcedly expanded at the end having the engaging lugs 13 by the partition unit forced into the internal space thereof, but the innermost partition unit 7 remains substantially closed at the end having the engaging lugs 13 by the action of the resilient connecting member 16 of its own. This manner of telescopically grouping the partition units is advantageous in that many partition units can be stored in a warehouse or on the site of construction without occupying a large space.

Figure 5:
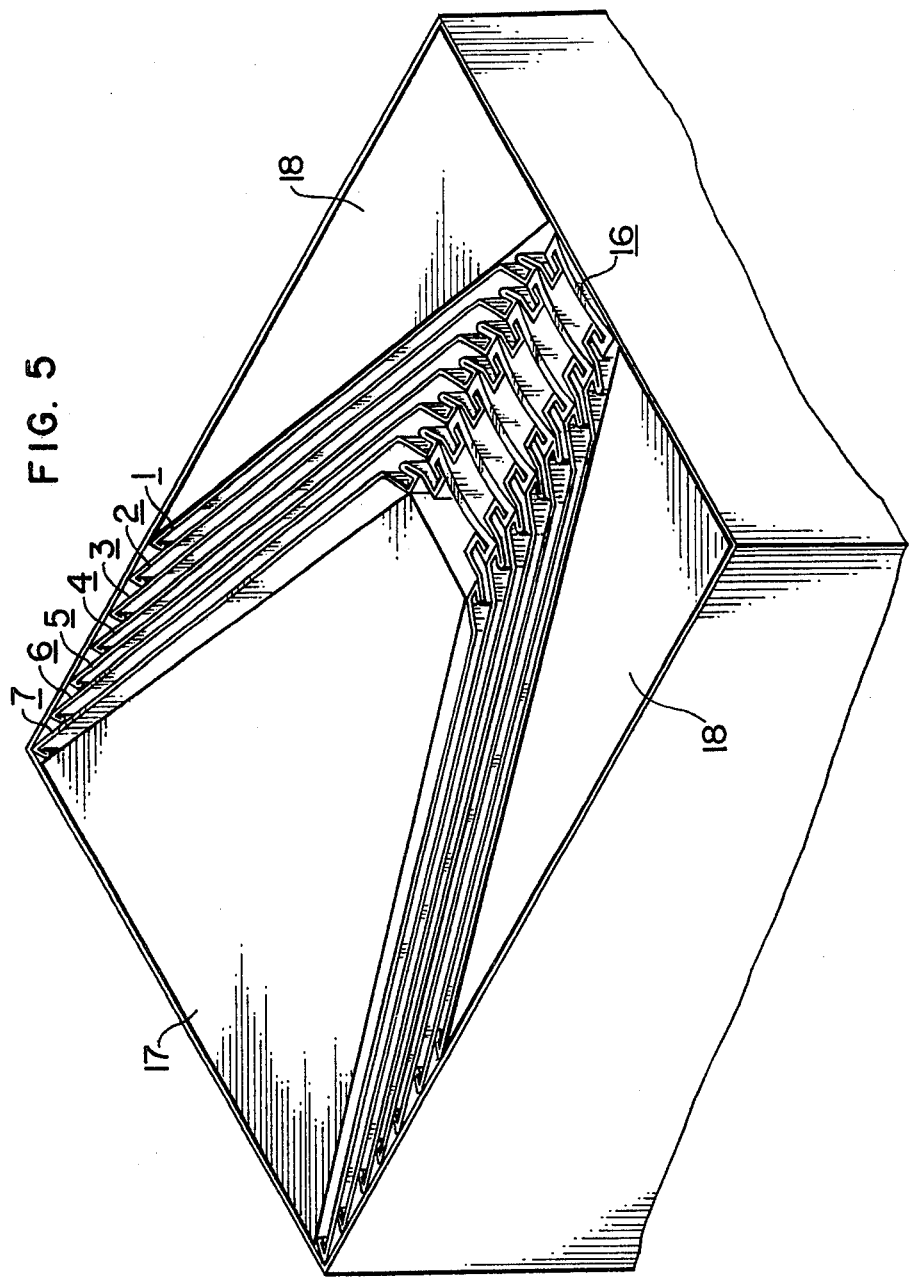
FIG. 5 is a schematic perspective view showing a plurality of these partition units in a completely telescoped and packaged state.

FIG. 5 shows the partition units 1 to 7 packaged so as to be suitable for transportation from the warehouse to the site of construction. In the state shown in FIG. 5, the partition units 1 to 7 are deeply telescoped more than the state shown in FIG. 4. More precisely, the partition unit 2 is forced into the internal space of the partition unit 1 until the connecting member 16 in the former engages at its side faces 16a (FIG. 2) with the outer bottom faces 14a (FIG. 2) of the engaging recesses 14 of the latter, thereby urging the wall surface forming members 11 and 12 of the partition unit 1 away from each other more than the state shown in FIG. 4. Similarly, the partition unit 2 is expanded by the partition unit 3. After telescoping all the partition units 1 to 7 in the manner above described, a spacer 17 of trapezoidal cross-sectional shape is inserted between the wall surface forming members 11 and 12 of the partition unit 7, and a pair of spacers 18 of triangular cross-sectional shape are disposed outside the wall surface forming members 11 and 12 of the partition unit 1 to provide a block of rectangular cross-sectional shape which can be snugly housed within a rectangular box 19. These spacers 17 and 18 may be hollow, and anchoring members and guide means described later may be accommodated in the hollow spacers. Therefore, many partition units can be very simply grouped into a single package without impairing the partition units. A plurality of such packages may be stacked up into a stack of small bulk for purposes of storage and transportation to facilitate handling of many partition units. Further, the above manner of telescopically grouping the partition units is advantageous in that a wall can be easily constructed by merely drawing the partition units one after another starting from the innermost one on the site of construction as described later. It is therefore unnecessary to assemble each partition unit on the site of construction by connecting the wall surface providing members 11 and 12 by the resilient connecting member 16.

Figure 6:
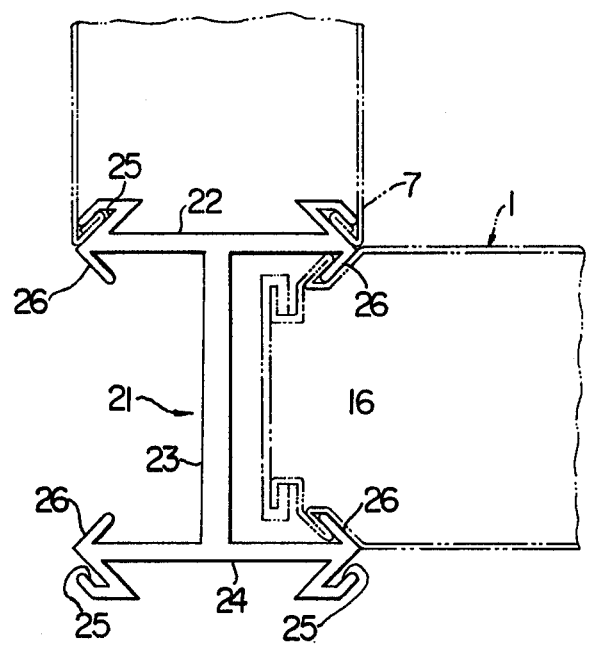
FIG. 6 is a schematic cross-sectional view of a post.

Referring to FIG. 6, a post 21 is shown which serves both as a pillar of a room and as means for anchoring the drawn-side ends of the partition units. The post 21 shown in FIG. 6 is provided with end anchoring means arranged in four directions and is composed of three members 22, 23 and 24 providing a substantially H-like cross-sectional shape. These members 22, 23 and 24 constituting the post 21 have a length approximately equal to the thickness of the associated partition units so that they can anchor the ends of the partition units when the partition units are fully drawn as shown in FIG. 1. A pair of engaging recesses 25 similar to the engaging recesses 14 are provided on the outer face of each of the side members 22 and 24 to fit on the engaging lugs 13 of the associated partition units, and a pair of engaging lugs 26 similar to the engaging lugs 13 are provided on the inner face of each of the side members 22 and 24 to fit in the engaging recesses 14 of the associated partition unit.

Figure 7:
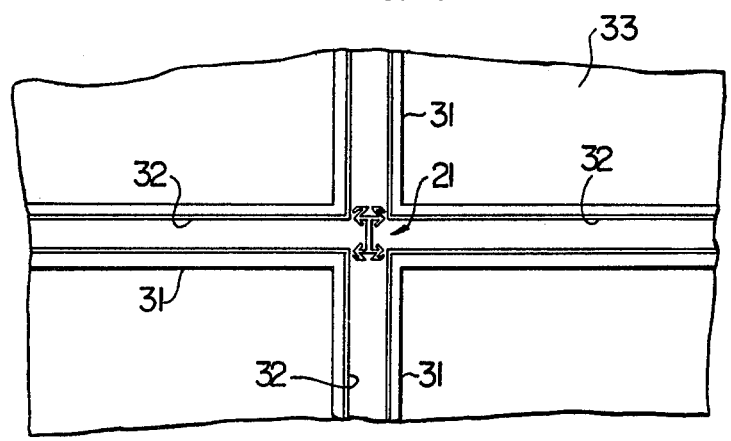
FIG. 7 is a schematic plan view showing an arrangement of guide grooves of a guide member together with the post.

FIG. 7 shows a guide member 31 which comprises grooves 32 for guiding the drawing movement of the partition units and engaging with the lower end of the partition units to locate the partition units in the wall defining position. Referring to FIG. 7 in which the guide member 31 is adapted to cooperate with the post 21 shown in FIG. 6, the grooves 32 are arranged in the form of a cross, and the post 21 is disposed at the cross point of the grooves 32. This guide member 31 may be directly disposed on a rough-finished floor 33, and a floor finishing material may then be coated to a thickness which provides a floor surface flush with the upper surface of the guide member 31. When the thickness of the coating of the floor finishing material is relatively small, channels may be provided in the rough-finished floor 33 so that the guide member 31 can be buried therein. The guide member 31 may, alternatively, not be used, and the grooves 32 may be directly provided in the floor surface.

The wall constructing process according to the present invention will be described with reference to a case in which, for example, seven partition units 1 to 7 are used to construct a wall, and such walls extend in four directions from the post 21 shown in FIG. 6. The engaging lugs 13 of the partition unit 7 shown by the two-dot chain lines in FIG. 6 can be easily fitted in the engaging recesses 25 of the side member 22 of the post 21 by merely expanding the partition unit 7 at the open end portion. The engaging recesses 14 of the partition unit 1 shown also by the two-dot chain lines in FIG. 6 can be easily fitted on the confronting engaging lugs 26 of the side members 22 and 24 by merely expanding the partition unit 1 at the open end portion thereby causing flexion of the resilient connecting member 16 in a manner as shown in FIG. 5.

Figure 8:
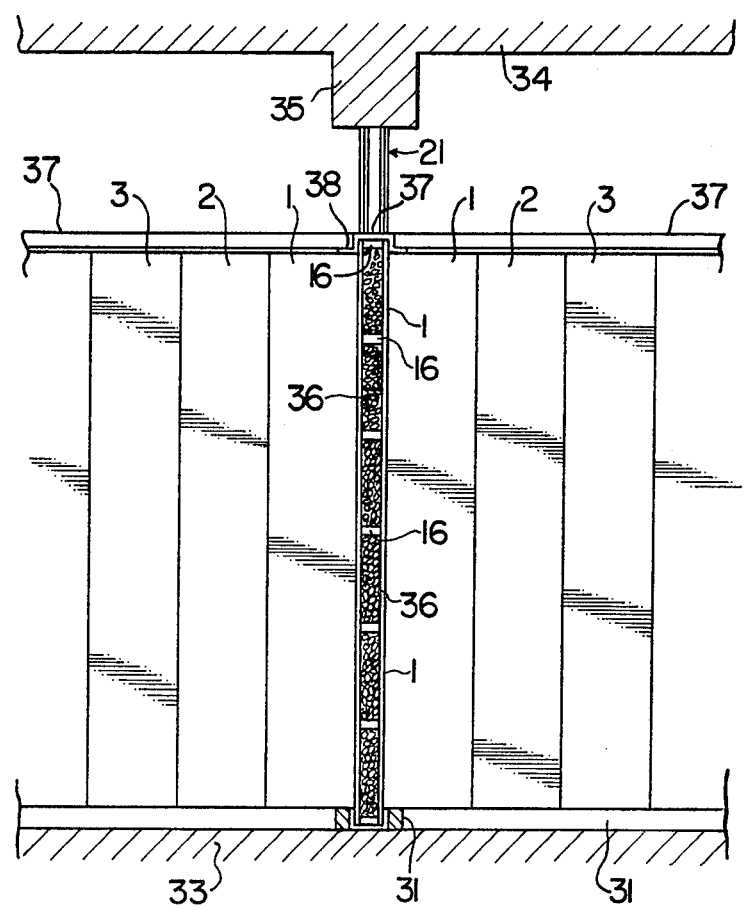
FIG. 8 is a schematic front elevational view of a constructed wall.

After the partition units 1 and 7 have been joined at one end thereof to two of the four sides respectively of the post 21, the lower end of the post 21 is fixed in a predetermined position on the floor 33, and the upper end thereof is fixed to a beam 35 of ceiling structure 34 as shown in FIG. 8. After having joined the partition unit 7 to one of the four sides of the post 21, the partition units 7 to 1 telescoped to be joined to that side of the post 21 are drawn in the order of 1, 2, 3, 4, 5, 6 while guiding the lower end thereof by the guide grooves 32 of the guide member 31. Similarly, the partition units 1 to 7 telescoped to be joined to another side of the post 21 are drawn in the order of 7, 6, 5, 4, 3, 2 while guiding the lower end thereof by the guide grooves 32. In the state in which the partition units 1 to 7 in each group are fully drawn, the engaging recesses 14 of the partition unit 2 are tightly engaged by the engaging lugs 13 of the partition unit 1, and the engaging recesses 14 of the partition unit 3 are tightly engaged by the engaging lugs 13 of the partition unit 2. In this manner, the engaging recesses 14 of the inner partition unit are tightly engaged by the engaging lugs 13 of the outer partition unit to provide continuous flat partition wall surfaces as seen in FIG. 2.

The partition units 1 to 7 are similarly joined to the remaining two sides of the post 21 by guiding them along the remaining guide grooves 32. After all the partition units have been drawn and joined to provide the partition wall surfaces extending in the four directions from the central post 21, a heat-insulating and sound-insulating filler material 36 such as powdery or granular slag, vermiculite, perlite or forming material is filled in the internal space of the joined partition units as shown in FIG. 8. The partition units can sufficiently withstand the lateral force imparted by the charged filler material, due to the fact that the wall surface forming members 11 and 12 in each partition unit are connected to each other by the resilient connecting member 16, and the adjoining partition units are tightly joined to each other by the combination of the engaging lugs 13 and engaging recesses 14. It is apparent that concrete may be used as the filler in lieu of the materials above described. After filling the filler in the internal space of the joined partition units, a hat-type cover member 37 having a flanged portion 38 is fixed to the upper end of each group of the partition units, and the flanged portion 38 of each cover member 37 may be utilized to support a decorative top board.

The partition units 1 to 7 are expanded as shown in FIG. 5 when they are fully telescoped for the purpose of packaging. When, however, the successive partition units 2 to 7 are drawn from the state of FIG. 5 to the state shown in FIG. 4, the thickness of each of the partition units is merely increased by the thickness of the wall surface providing members of the directly overlapping one. Therefore, the partition units 1 to 7 can be fitted at their lower end in the grooves 32 of the guide member 31 in the state shown in FIG. 4 utilizing the resiliency of the resilient connecting members 16. After fitting all the partition units 1 to 7 in the guide grooves 32 in the state shown in FIG. 4, the partition units 1 to 7 are drawn one after another along the guide grooves 32.

Figure 9A:
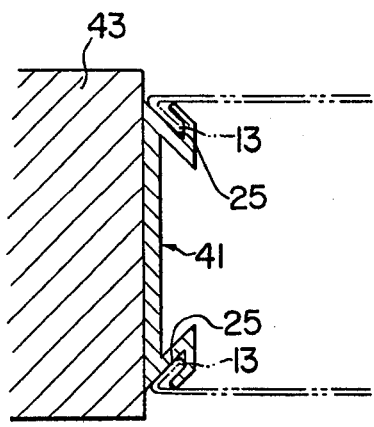
FIGS. 9a and 9b are schematic cross-sectional views showing two types of anchoring members used for anchoring the partition units to pillars in a building.
Figure 9B:
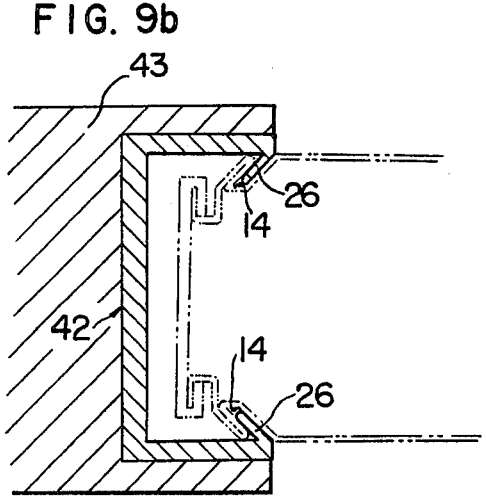

The partition unit groups extending from the central post 21 in the four directions are fixed at the other end thereof to pillars 43 in the building by anchoring members 41 and 42 as shown in FIGS. 9a and 9b respectively. The end anchoring member 41 shown in FIG. 9a is formed with a pair of engaging recesses 25 similar to the engaging recesses 14 for engagement with the engaging lugs 13 of, for example, the partition unit 7 remotest from the post 21 shown in FIG. 6. The end anchoring member 42 shown in FIG. 9b is formed with a pair of engaging lugs 26 similar to the engaging lugs 13 for engagement with the engaging recesses 14 of, for example, the partition unit 1 remote from the post 21 shown in FIG. 6. In FIG. 9b, resilient connecting member 16 in the partition unit 1 is located within the extent of the substantially U-like space defined by the end anchoring member 42. This end anchoring member 42 is received in a recess provided in the pillar 43.

The pillars 43 shown in FIGS. 9a and 9b are erected in usual manner. When it is desired to construct the wall according to the present invention between the pillars 43, the end anchoring members 41 and 42 shown in FIGS. 9a and 9b are used to anchor the ends of the wall to the pillars 43.

It will be understood from the foregoing description, that the present invention provides a wall which is constructed by a novel method which is entirely different from prior art method. The present invention is advantageous in that inexperienced workers can easily construct the wall, and the partition units can be telescoped into a block of relatively small bulk which can be efficiently stored and transported.

What is claimed is:

1. A wall comprising a plurality of partition units each including a pair of wall surface forming members of small thickness disposed opposite each other with a predetermined distance therebetween to provide partition wall surfaces, connecting means including at least one connecting member for connecting said wall surface forming members together by engaging with one end thereof and normally urging the other non-connected ends of said wall surface forming members toward each other in a closing direction, each of said wall surface forming members being formed adjacent to both ends thereof with engaging means engageable with similar engaging means of mating shape formed adjacent to the associated ends of the adjoining wall surface forming member when joined together, each of said partition units being adapted to be telescoped into the internal space of another at the end provided with said connecting means, guide means for guiding drawing movement of said telescoped partition units drawn one after another, said guide means engaging with at least one end of said partition units parallel to the drawing direction of said partition units to determine the drawing direction thereof during construction of the wall by successively drawing said telescoped partition units.

2. A wall as claimed in claim 1, further comprising a first anchoring member for supporting said non-connected ends of said wall surface forming members while maintaining the predetermined distance between said non-connected ends, and a second anchoring member for supporting said connected ends of said wall surface forming members together with said connecting means, whereby, when a wall is constructed by a plurality of said partition units, the end of the outermost partition units can be closed by said first and second anchoring members respectively.

3. A wall as claimed in claim 1, wherein said engaging means comprises an engaging lug formed by bending diagonally inward a portion of said non-connected end of each of said wall surface forming members, and an engaging recesses formed adjacent to said connected end of each of said wall surface forming members to be directed diagonally outward, said engaging recesses of the inner partition units being engaged by said engaging lugs of the outer partition units in the telescoped group so as to join said partition units together to provide the continuous flat partition wall surfaces.

4. A wall as claimed in claim 1, wherein said guide means comprises a plurality of guide grooves engaging with at least the upper or lower end of said partition units so as to guide said partition units along the drawing direction and maintain the same in exactly vertical position.

5. A wall as claimed in claim 3, wherein said connecting means engages with a pair of stepped portions formed adjacent to said engaging recesses of said wall surface forming members include in each said partition unit and protruding inward to normally hold said connecting means within the space defined between said wall surface providing members.

6. A method for constructing a wall comprising preparing a plurality of partition units of substantially U-like cross-sectional shape, grouping said partition units into a telescoped assembly by forcing each of the successive units into the internal space of another, transporting said partition units to the site of construction in the telescopically assembled state, drawing said partition units one after another from the telescoped assembly while guiding them by guide means engaging with the upper or lower end thereof until all said partition units are completely drawn to be joined at their trailing end to the leading end of the adjoining ones to provide continuous flat partition wall surfaces.

7. A wall as claimed in claim 1, further comprising a filler material filled in the internal space of the joined partition units providing the partition wall surfaces.

8. A wall as claimed in claim 7, further comprising a first anchoring member for supporting said non-connected ends of said wall surface forming members while maintaining the predetermined distance between said ends, and a second anchoring member for supporting said connected ends of said wall surface forming members together with said connecting means, whereby, when a wall is constructed by a plurality of said partition units, the ends of the outermost partition units can be closed by said first and second anchoring members respectively.

9. A wall as claimed in claim 7, wherein said engaging means comprises an engaging lug formed by bending diagonally inward a portion of said non-connected end of each of said wall surface forming members, and an engaging recess formed adjacent to said connected end of each of said wall surface forming members to be directed diagonally outward, said engaging recesses of the inner partition units being engaged by said engaging lugs of the outer partition units in the telescoped group so as to join said partition units together to provide the continuous flat partition wall surfaces.

10. A wall as claimed in claim 7, wherein said guide means comprises a plurality of guide grooves engaging with at least the upper or lower end of said partition units so as to guide said partition units along the drawing direction and maintain the same in exactly vertical position.

11. A wall as claimed in claim 9, wherein said connecting means engages with a pair of stepped portions formed adjacent to said engaging recesses of said wall surface providing members constituting each said partition unit and protruding inward to normally hold said connecting means within the space defined between said wall surface providing members.

12. A process for constructing a wall as claimed in claim 6, further comprising the step of filling a filler material in the internal space of the joined partition units to complete the wall.

* * * * *